(12) United States Patent
Nakaoka

(10) Patent No.: US 11,640,535 B2
(45) Date of Patent: May 2, 2023

(54) PROBABILITY ACQUISITION APPARATUS AND PROBABILITY ACQUISITION METHOD

(71) Applicant: HONDA MOTOR CO., LTD., Tokyo (JP)

(72) Inventor: Akira Nakaoka, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 345 days.

(21) Appl. No.: 17/141,626

(22) Filed: Jan. 5, 2021

(65) Prior Publication Data

US 2021/0216748 A1 Jul. 15, 2021

(30) Foreign Application Priority Data

Jan. 15, 2020 (JP) .............................. JP2020-004590

(51) Int. Cl.

| | |
|---|---|
| *G06N 3/084* | (2023.01) |
| *G06V 20/64* | (2022.01) |
| *G06V 10/30* | (2022.01) |
| *G06F 18/22* | (2023.01) |
| *G06V 10/44* | (2022.01) |
| *G06V 10/75* | (2022.01) |
| *G06V 10/764* | (2022.01) |
| *G06V 10/82* | (2022.01) |
| *G06N 3/04* | (2023.01) |
| *G06N 3/08* | (2023.01) |

(52) U.S. Cl.
CPC .............. *G06N 3/084* (2013.01); *G06F 18/22* (2023.01); *G06N 3/04* (2013.01); *G06N 3/08* (2013.01); *G06V 10/30* (2022.01); *G06V 10/443* (2022.01); *G06V 10/454* (2022.01); *G06V 10/75* (2022.01); *G06V 10/764* (2022.01); *G06V 10/82* (2022.01); *G06V 20/653* (2022.01)

(58) Field of Classification Search
CPC ............ G06N 3/084; G06N 3/04; G06N 3/08; G06N 3/045; G06N 3/044; G06F 18/22; G06V 10/30; G06V 10/443; G06V 10/75; G06V 10/764; G06V 10/82; G06V 20/653
See application file for complete search history.

(56) References Cited

FOREIGN PATENT DOCUMENTS

JP 6548686 B2 7/2019

OTHER PUBLICATIONS

Kawasaki, Taro et al. "An image processing approach to feature-preserving B-spline surface fairing." Computer-Aided Design 99 (2018): 1-10 (Year: 2018).*

* cited by examiner

*Primary Examiner* — Edward F Urban
*Assistant Examiner* — Wassim Mahrouka
(74) *Attorney, Agent, or Firm* — Squire Patton Boggs (US) LLP

(57) ABSTRACT

To provide a probability acquisition apparatus and the like that can provide accurate probabilities of a match and a mismatch between two three-dimensional images of a target object, a probability acquisition apparatus performs zebra shading processing on a first image that is a three-dimensional image of an automotive clay model and a second image that is a 3D-CAD image to obtain a first zebra image and a second zebra image, obtains a first selected image from the first zebra image with noise removed and a second selected image from the second zebra image with features extracted, and inputs a superimposition image of the first selected image and the second selected image to a CNN 15b to thereby obtain a probability of a match between the first selected image and the second selected image.

7 Claims, 11 Drawing Sheets

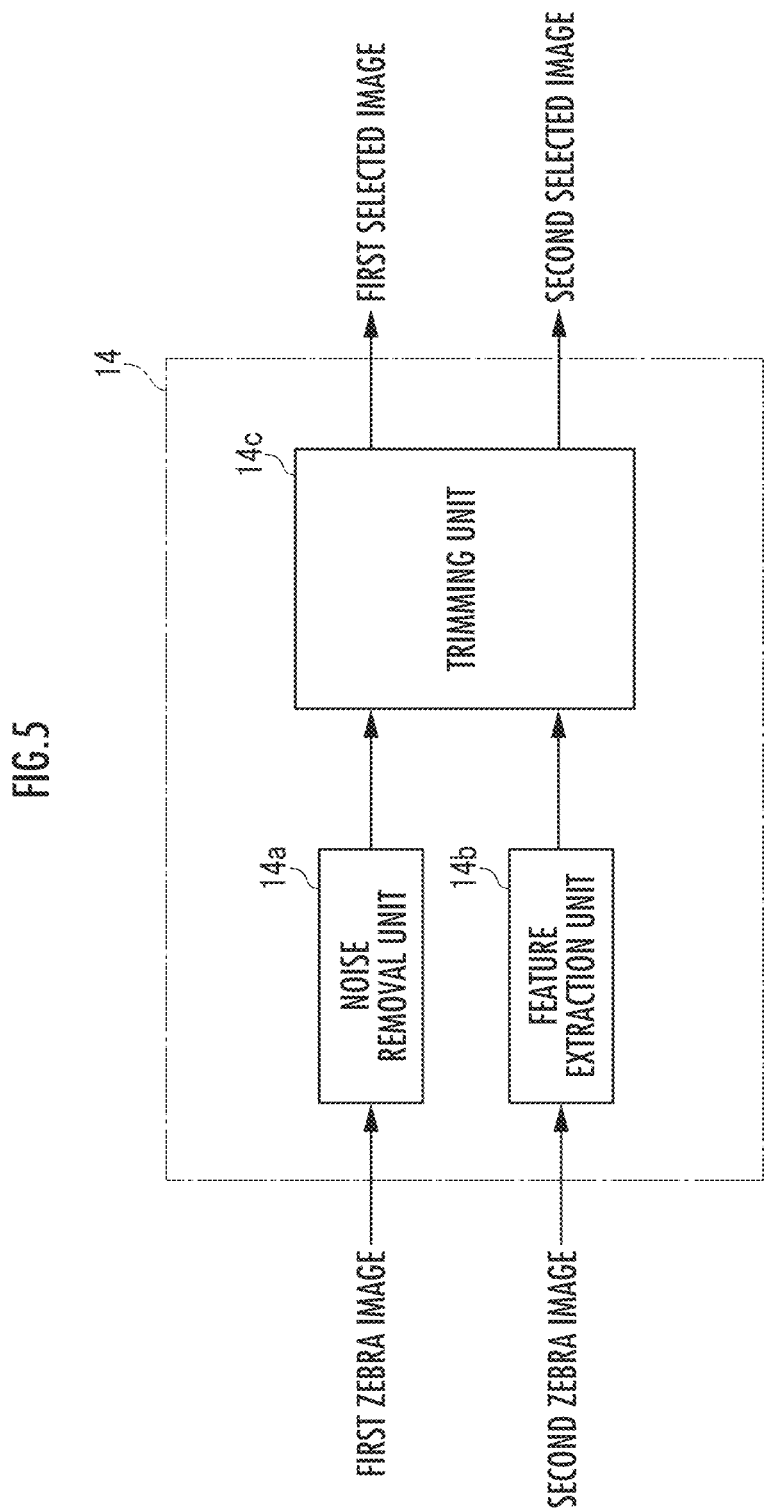

FIRST SELECTED IMAGE

SECOND SELECTED IMAGE

PROBABILITY ACQUISITION APPARATUS AND PROBABILITY ACQUISITION METHOD

BACKGROUND OF THE INVENTION

Field of the Invention

The present invention relates to a probability acquisition apparatus and the like for obtaining probabilities of a match and a mismatch between two three-dimensional images of a target object.

Description of the Related Art

A conventional image monitoring apparatus described in Japanese Patent No. 6548686 is known. This image monitoring apparatus monitors a predetermined space for the presence of persons and suspicious objects and includes a monitoring camera and an image processing unit. The monitoring camera captures a three-dimensional actual image of the monitored space, and the image processing unit performs edge processing on the actual image.

A simulated image of the monitored space is generated using a three-dimensional model or the like in a memory and is subjected to the edge processing. Then, comparison between the actual image and the simulated image that have been subjected to the edge processing produces differential pixels of the actual image with respect to the simulated image. Processing such as detection of an object is performed based on the differential pixels.

In recent years, as part of the process to design an automobile or other three-dimensional target objects, a prototype such as a clay model is created and then its 3D-CAD image, which is a simulated image of the prototype, is generated using predetermined 3D-CAD software. The 3D-CAD image is required to be created with high accuracy so as to be as close to the prototype in external geometry as possible. Thus, when an actual image is created from data taken by measuring or imaging the prototype, there is a need for the 3D-CAD image to be as close to the actual image as possible. To meet this need, it is necessary to acquire the probability of a match and a mismatch between the 3D-CAD image and the actual image with high accuracy.

The probabilities of a match and a mismatch between the 3D-CAD image and the actual image obtained using the method described in the aforementioned patent literature are not very accurate. This is a problem not only with probabilities of a match and a mismatch between a 3D-CAD image and an actual image but also with those between a simulated image created using other software and an actual image. Furthermore, there is a demand for accurate probabilities of a match and a mismatch, not just between the foregoing types of simulated image and actual image, but also between a three-dimensional simulated image of a target object and a three-dimensional image obtained from data taken by measuring or imaging the target object.

The present invention, which has been achieved to solve the problems described above, has an object of providing a probability acquisition apparatus and the like that can provide accurate probabilities of a match and a mismatch between two three-dimensional images of a target object.

SUMMARY OF THE INVENTION

To attain the object described above, a probability acquisition apparatus according to claim 1 comprises: a first image acquisition unit configured to obtain a first image that is a three-dimensional image of a target object from data taken by measuring or imaging the target object; a second image acquisition unit configured to obtain a second image that is a three-dimensional simulated image of the target object; a zebra image acquisition unit configured to obtain a first zebra image by subjecting the first image to zebra shading processing and a second zebra image by subjecting the second image to the zebra shading processing, the first zebra image and the second zebra image having an identical angle, an identical scale, and an identical length-by-width size; a selected-image acquisition unit configured to obtain a first selected image by selecting at least an image region of the target object from the first zebra image and subjecting the image region selected from the first zebra image to predetermined first image processing and to obtain a second selected image by selecting an image region identical to that of the first selected image from the second zebra image and subjecting the identical image region selected from the second zebra image to predetermined second image processing; and a probability acquisition unit configured to input the first selected image and the second selected image to a predetermined machine learning model so as to obtain probabilities of a match and a mismatch between the first selected image and the second selected image as output of the predetermined machine learning model.

In this aspect of the probability acquisition apparatus, a first image that is a three-dimensional image of a target object is obtained from data taken by actually measuring or imaging the target object and a second image that is a three-dimensional simulated image of the target object is obtained. A first zebra image is obtained by subjecting the first image to zebra shading processing, and a second zebra image is obtained by subjecting the second image to the zebra shading processing. The first zebra image and the second zebra image have an identical angle, an identical scale, and an identical length-by-width size.

Furthermore, a first selected image is obtained by selecting at least an image region of the target object from the first zebra image and subjecting the image region selected from the first zebra image to predetermined first image processing, and a second selected image is obtained by selecting an image region identical to that of the first selected image from the second zebra image and subjecting the identical image region selected from the second zebra image to predetermined second image processing. The first selected image and the second selected image are input to a predetermined machine learning model so that the predetermined machine learning model outputs probabilities of a match and a mismatch between the first selected image and the second selected image. Therefore, by using, as the predetermined machine learning model, a model that has sufficiently learned model parameters, accurate probabilities of a match and a mismatch between the first selected image and the second selected image can be obtained.

In an aspect of the invention according to claim 2, which is an aspect of the probability acquisition apparatus of claim 1, the image region selected from the first zebra image is subjected to predetermined noise removal processing in the predetermined first image processing, and the identical image region selected from the second zebra image is subjected to predetermined feature extraction processing in the predetermined second image processing.

In this aspect of the probability acquisition apparatus, the first selected image is obtained by subjecting the image region selected from the first zebra image to the predetermined noise removal processing; thus, in the first selected image obtained, the noise effect of the first zebra image can be inhibited. Also, the second selected image is obtained by subjecting the image region that is selected from the second zebra image and identical to the first selected image to the predetermined feature extraction processing; thus, in the second selected image obtained, the characteristics of the selected image region can be enhanced. Therefore, accuracy with which probabilities of a match and a mismatch between the first selected image and the second selected image are obtained can be improved.

In an aspect of the invention according to claim 3, which is an aspect of the probability acquisition apparatus of claim 2, the predetermined noise removal processing is one of median filter processing and dilation erosion processing.

In this aspect of the probability acquisition apparatus, the first selected image is obtained by subjecting the image region selected from the first zebra image to one of median filter processing and dilation erosion processing; thus, in the first selected image obtained, the noise effect contained in the image region can be inhibited.

In an aspect of the invention according to claim 4, which is an aspect of the probability acquisition apparatus according to claim 2, the predetermined feature extraction processing is one of Sobel filter processing, a Canny method, and a skelton method.

In this aspect of the probability acquisition apparatus, the second selected image is obtained by performing one of the Sobel filter processing, the Canny method, and a skelton method; thus, in the second selected image obtained, features in the image portion selected from the second zebra image can be extracted appropriately.

In an aspect of the invention according to claim 5, which is an aspect of the probability acquisition apparatus according to claim 1, the zebra image acquisition unit obtains both of the first zebra image and the second zebra image in grayscale.

In this aspect of the probability acquisition apparatus, the first zebra image and the second zebra image are obtained in grayscale; thus, the operation load during the image processing can be smaller than that with color images if used as the first zebra image and the second zebra image. Additionally, errors resulting from coloring conditions can be inhibited.

In an aspect of the invention according to claim 6, which is an aspect of the probability acquisition apparatus according to claim 1, the predetermined machine learning model is a CNN, the selected-image acquisition unit obtains the first selected image and the second selected image that have an aspect ratio of 1:1, and the probability acquisition unit inputs a superimposition image obtained by superimposing the first selected image and the second selected image to the CNN.

In general, if the machine learning model is a CNN (convolutional neural network) and an image input to the CNN does not have an aspect ratio of 1:1, some type of additional image processing step is required to change the aspect ratio to 1:1. In this aspect of the probability acquisition apparatus, the first selected image and the second selected image have an aspect ratio of 1:1 and a superimposition image obtained by superimposing the first selected image and the second selected image is input to the CNN; thus, when learning of model parameters of the CNN is performed, the learning process can be executed with ease.

Furthermore, to attain the object described above, a probability acquisition method according to claim 7 comprises: obtaining a first image that is a three-dimensional image of a target object from data taken by measuring or imaging the target object; obtaining a second image that is a three-dimensional simulated image of the target object; obtaining a first zebra image by subjecting the first image to zebra shading processing and a second zebra image by subjecting the second image to the zebra shading processing, the first zebra image and the second zebra image having an identical angle, an identical scale, and an identical length-by-width size; obtaining a first selected image by selecting at least an image region of the target object from the first zebra image and subjecting the image region selected from the first zebra image to predetermined first image processing; obtaining a second selected image by selecting an image region identical to that of the first selected image from the second zebra image and subjecting the identical image region selected from the second zebra image to predetermined second image processing; and inputting the first selected image and the second selected image to a predetermined machine learning model so as to obtain probabilities of a match and a mismatch between the first selected image and the second selected image.

BRIEF DESCRIPTION OF THE DRAWINGS

FIG. 5 is a block diagram illustrating a functional configuration of a selected-image acquisition unit;

DETAILED DESCRIPTION OF THE PREFERRED EMBODIMENTS

A probability acquisition apparatus according to an embodiment of the present invention is described with reference to the drawings below. The probability acquisition apparatus according to the present embodiment compares a three-dimensional image created based on an automotive clay model (not shown) serving as a target object with a three-dimensional image created using 3D-CAD software to thereby provide probabilities of a match and a mismatch between the two images as described below.

Figure 1:
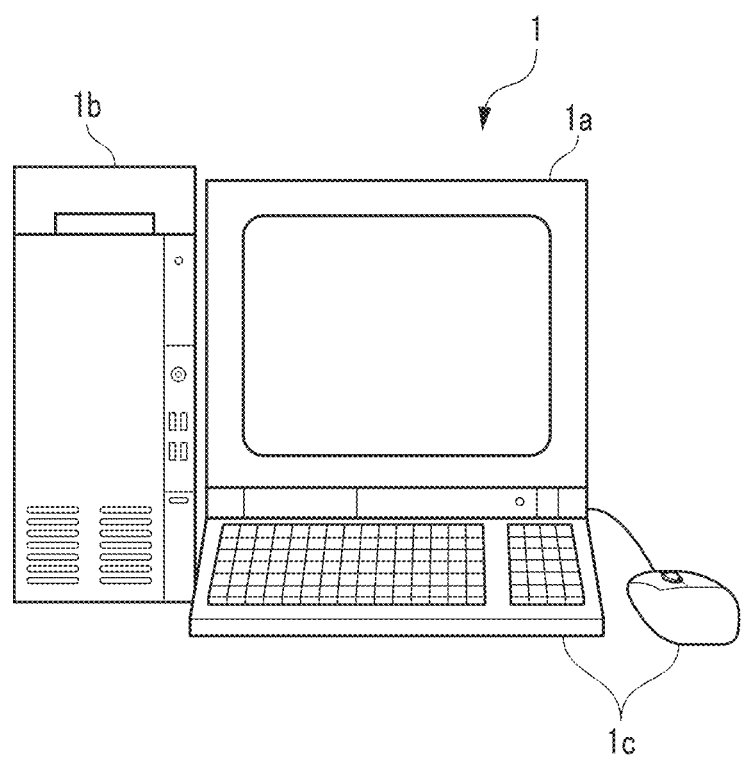
FIG. 1 is a diagram illustrating a personal computer serving as a probability acquisition apparatus according to an embodiment of the present invention.

As illustrated in FIG. 1, a probability acquisition apparatus 1 according to the present embodiment is a personal computer type and includes a display 1a, an apparatus main body 1b, and input interfaces 1c. The apparatus main body 1b includes a storage such as an HDD, a processor, and memory (RAM, E2PROM, ROM, and the like) (all not shown).

The storage of the apparatus main body 1b includes installed therein three-dimensional CAD software and application software for executing various types of processing described below. The input interfaces 1c may be a keyboard and a mouse for operating the probability acquisition apparatus 1.

Figure 2:
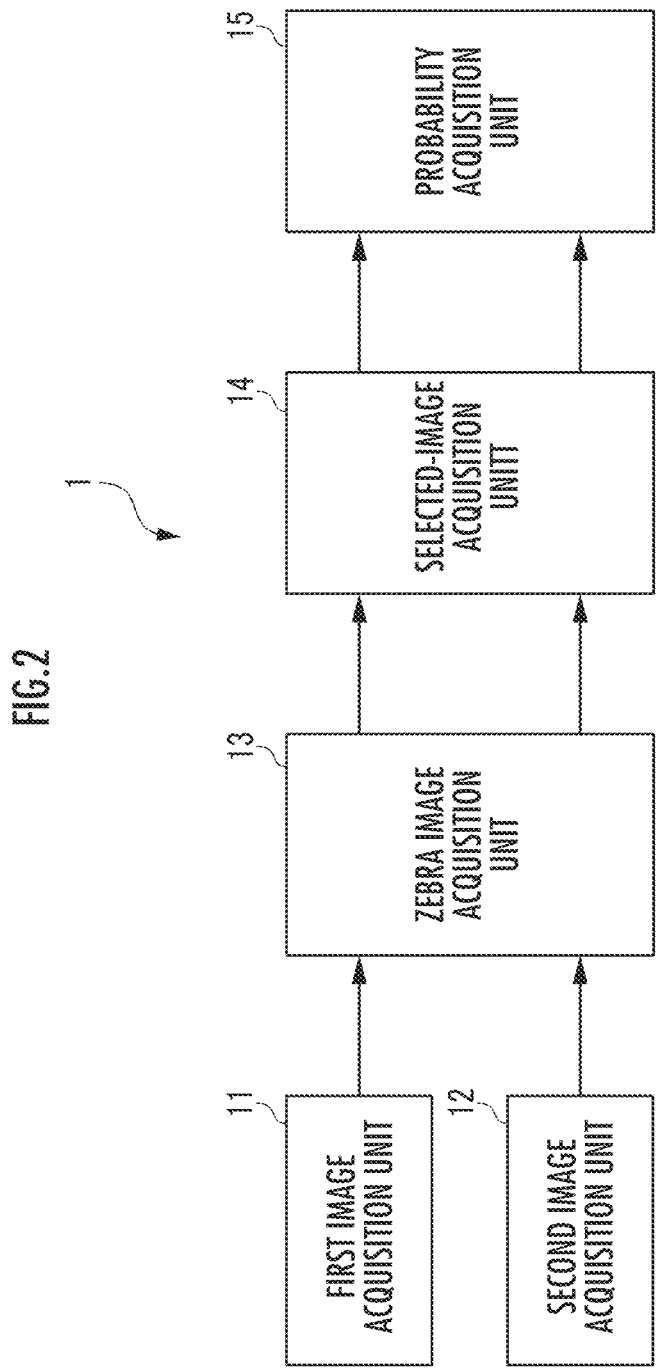
FIG. 2 is a block diagram illustrating a functional configuration of the probability acquisition apparatus.

A functional configuration of the probability acquisition apparatus 1 according to the present embodiment is described below with reference to FIG. 2. As shown in FIG. 2, the probability acquisition apparatus 1 includes a first image acquisition unit 11, a second image acquisition unit 12, a zebra image acquisition unit 13, a selected-image acquisition unit 14, and a probability acquisition unit 15.

The first image acquisition unit 11 obtains a first image in the form of a three-dimensional image from an automotive clay model using a method described below. First, the automotive clay model is scanned with a three-dimensional scanner (not shown) to obtain point group data which is subjected to polygon mesh processing to acquire polygon mesh data.

Then, the polygon mesh data is rendered with shading to obtain the first image. The first image acquired as described above is input to the zebra image acquisition unit 13.

The second image acquisition unit 12 reads the polygon mesh data using the CAD software residing in the storage of the apparatus main body 1b. From the polygon mesh data, the CAD software creates surface data, which is then rendered with shading to obtain a second image, which is a simulated image. The second image is a three-dimensional image of a region identical to that of the first image and has an angle, a scale, and a length-by-width size identical to those of the first image. The second image acquired as described above is input to the zebra image acquisition unit 13.

The zebra image acquisition unit 13 is described below. The zebra image acquisition unit 13 acquires a first zebra image and a second zebra image from the first image and the second image as described below.

Figure 3:
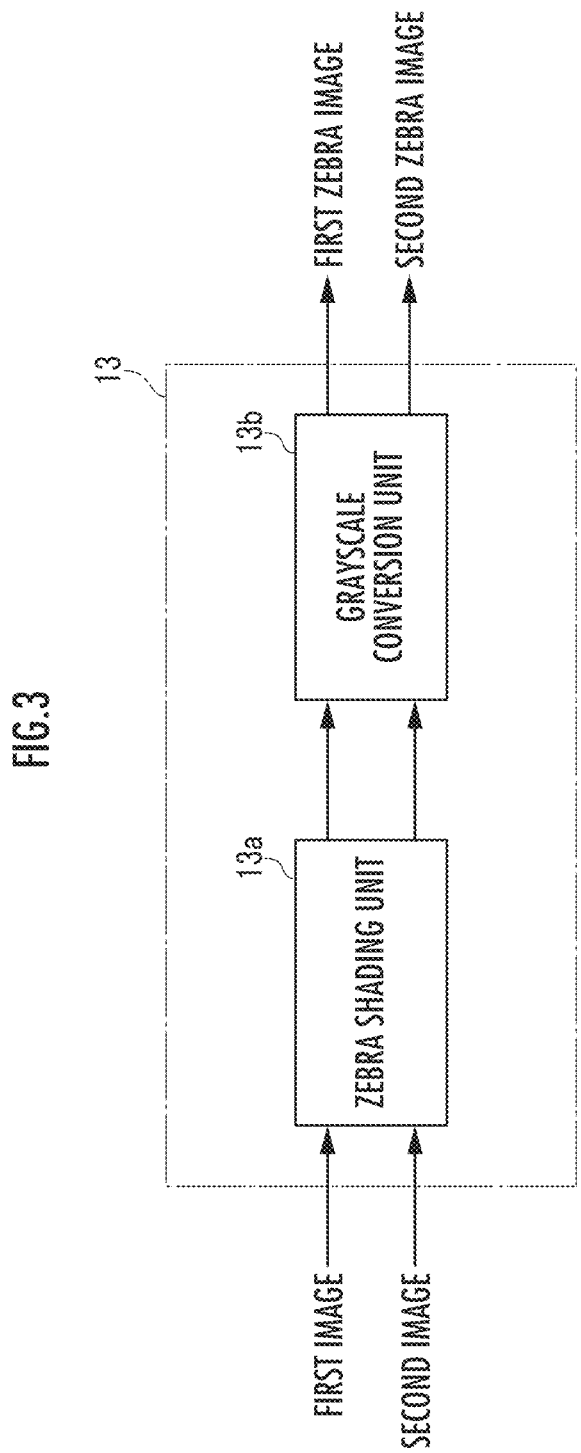
FIG. 3 is a block diagram illustrating a functional configuration of a zebra image acquisition unit.

As illustrated in FIG. 3, the zebra image acquisition unit 13 includes a zebra shading unit 13a and a grayscale conversion unit 13b. The zebra shading unit 13a performs zebra shading processing on the first image and the second image.

The grayscale conversion unit 13b performs grayscale conversion on the first image and second image that have been subjected to the zebra shading processing to thereby create the first zebra image and the second zebra image.

Figure 4A:
FIG. 4A is a diagram illustrating an example first zebra image.
Figure 4B:
FIG. 4B is a diagram illustrating an example second zebra image.

For example, the first zebra image is created as shown in FIG. 4A, and the second zebra image as shown in FIG. 4B. As seen in FIGS. 4A and 4B, the first zebra image and the second zebra image have an identical angle, an identical scale, and an identical length-by-width size (an identical number of pixels). The first zebra image and the second zebra image created as described above are input to the selected-image acquisition unit 14.

The selected-image acquisition unit 14 is described next below. The selected-image acquisition unit 14 acquires a first selected image and a second selected image from the first zebra image and the second zebra image as described below.

As illustrated in FIG. 5, the selected-image acquisition unit 14 includes a noise removal unit 14a, a feature extraction unit 14b, and a trimming unit 14c. The selected-image acquisition unit 14 inputs the first zebra image to the noise removal unit 14a and the second zebra image to the feature extraction unit 14b.

The noise removal unit 14a removes noise from the first zebra image by median filter processing. In the present embodiment, the median filter processing and the trimming processing correspond to predetermined first image processing, and the median filter processing corresponds to predetermined noise removal processing. The first zebra image with noise removed is then input to the trimming unit 14c.

The feature extraction unit 14b extracts features from the second zebra image by Sobel filter processing. In the present embodiment, the Sobel filter processing and the trimming processing correspond to predetermined second image processing, and the Sobel filter processing corresponds to predetermined feature extraction processing. The second zebra image with features extracted is then input to the trimming unit 14c.

The trimming unit 14c acquires n pairs (n being a positive integer) of a first selected image and a second selected image from the first zebra image with noise removed and the second zebra image with features extracted by the trimming processing, where one pair is made up of one first selected image and one second selected image.

The first selected image and the second selected image in each pair are square images, or images having an aspect ratio of 1:1, of an identical region. This is due to the reason described below. As described below, the first selected image and the second selected image are superimposed to create a superimposition image, which is then input to a CNN. Thus, a first selected image and a second selected image that do not have an aspect ratio of 1:1 would need to be transformed to images having an aspect ratio of 1:1 through some type of additional image processing step. To eliminate the need for such an additional image processing step, the first selected image and the second selected image in each pair are obtained in the form of images having an aspect ratio of 1:1.

Figure 6A:
FIG. 6A is a diagram illustrating an example first selected image.
Figure 6B:
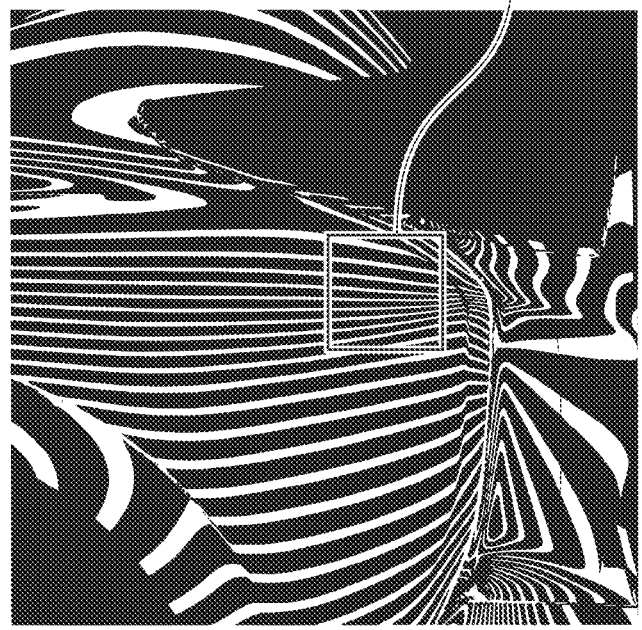
FIG. 6B is a diagram illustrating an example second selected image.

For example, when a first selected image of a square region is obtained by trimming a first zebra image with noise removed as illustrated in FIG. 6A, a second selected image of a square region is obtained by trimming a second zebra image with features extracted as illustrated in FIG. 6B. In the present embodiment, a trimming technique is used in the trimming unit 14c as described above. The trimming technique in the trimming unit 14c is not limited to the technique described above and other techniques described below may be used.

Additionally, as long as n pairs of the first selected image and the second selected image are square images, different pairs of the first selected image and the second selected image may have different sizes. For example, a first selected image and a second selected image in a pair may be of a size different from that of a first selected image and a second selected image in another pair. Furthermore, if the first zebra image with noise removed and the second zebra image with features extracted are both square images, the entire first zebra image may be used as the first selected image and the entire second zebra image may be used as the second selected image.

In the present embodiment, n pairs of the first selected image and the second selected image are obtained by the selected-image acquisition unit 14 as described above and then input to the probability acquisition unit 15.

The probability acquisition unit 15 is described next below. The probability acquisition unit 15 performs processing on n pairs of the first selected image and the second selected image, such as determining a match and a mismatch between a first selected image and a second selected image in each pair, as described below.

Figure 7:
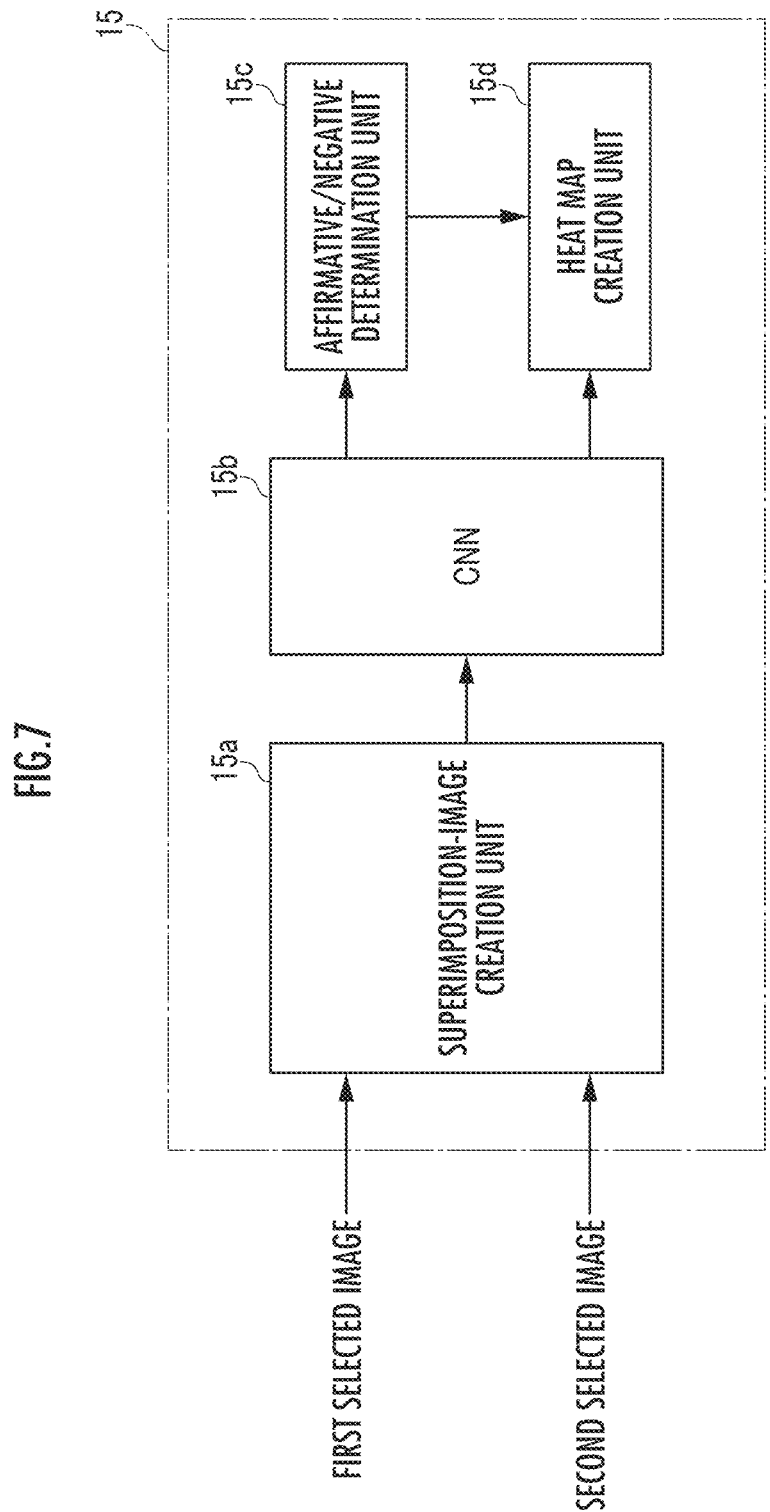
FIG. 7 is a block diagram illustrating a functional configuration of a probability acquisition unit.

As illustrated in FIG. 7, the probability acquisition unit 15 includes a superimposition-image creation unit 15*a*, a CNN 15*b*, an affirmative/negative determination unit 15*c*, and a heat map creation unit 15*d*.

The superimposition-image creation unit 15*a* superimposes a first selected image and a second selected image in each pair to create n superimposition images, n being the number of the superimposition images. A superimposition image thus has a length-by-width size identical to those of the first selected image and the second selected image. Then, the n superimposition images created as described above are input to the CNN (convolutional neural network) 15*b* one by one.

When receiving a superimposition image as described above, the CNN 15*b* outputs probabilities of a match label and a mismatch label, the labels being a "match" and a "mismatch" between a first selected image and a second selected image included in the superimposition image serving as the labels. A probability of a match label is output as a value within a range of 0 to 1, whereas that of a mismatch label is output as a value resulting from subtraction of the probability of the match label from the value 1.

In the case of the CNN 15*b*, its model parameters (a weight and a bias) are learned as described below. First, match data and mismatch data are created as learning data. The match data is created by superimposing a first selected image and a second selected image that match each other and giving it the label of "match."

The mismatch data is created by superimposing a first selected image and a second selected image that do not match each other and giving it the label of "mismatch."

When the match data is input to the CNN 15*b*, the model parameters are learned with the CNN 15*b* through backpropagation or the like using a loss function (for example, mean squared error) of the value "1" and a probability of the match label output from the CNN 15*b*.

Similarly, when the mismatch data is input to the CNN 15*b*, the model parameters are learned with the CNN 15*b* through backpropagation or the like using a loss function (for example, mean squared error) of the value "1" and a probability of the mismatch label output from the CNN 15*b*.

In the case of the CNN 15*b* according to the present embodiment, the model parameters are sufficiently learned using the method described above. Thus, when receiving a superimposition image described above, the CNN 15*b* outputs probabilities of the match label and the mismatch label and inputs the probability of the match label to the affirmative/negative determination unit 15*c*. The probability of the match label represents the probability of a match between a first selected image and a second selected image of the superimposition image that is input.

The affirmative/negative determination unit 15*c* determines that a pair of a first selected image and a second selected image in the superimposition image match each other if a score resulting from percentage conversion of the probability of the match label is equal to or greater than a predetermined value (50%, for example). The affirmative/negative determination unit 15*c* determines that they do not match each other if the score is less than a predetermined value (50%, for example).

The affirmative/negative determination unit 15*c* performs the determination of match/mismatch between the first selected image and the second selected image for all the n superimposition images. As described below, determination results and scores for the respective n superimposition images can be presented in the display 1*a*, and a determination result and a score for the entirety of the n superimposition images can be also presented in the display 1*a*.

The score for the entirety of the n superimposition images is an average of the scores of the n superimposition images. The score for the entirety of the n superimposition images thus represents whether the first zebra image and the second zebra image match each other as a whole.

Figure 8A:
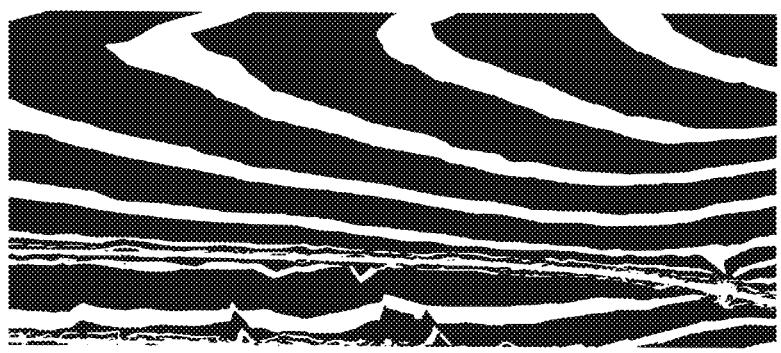
FIG. 8A is a diagram illustrating another example first zebra image.
Figure 8B:
FIG. 8B is a diagram illustrating another example second zebra image.
Figure 9:
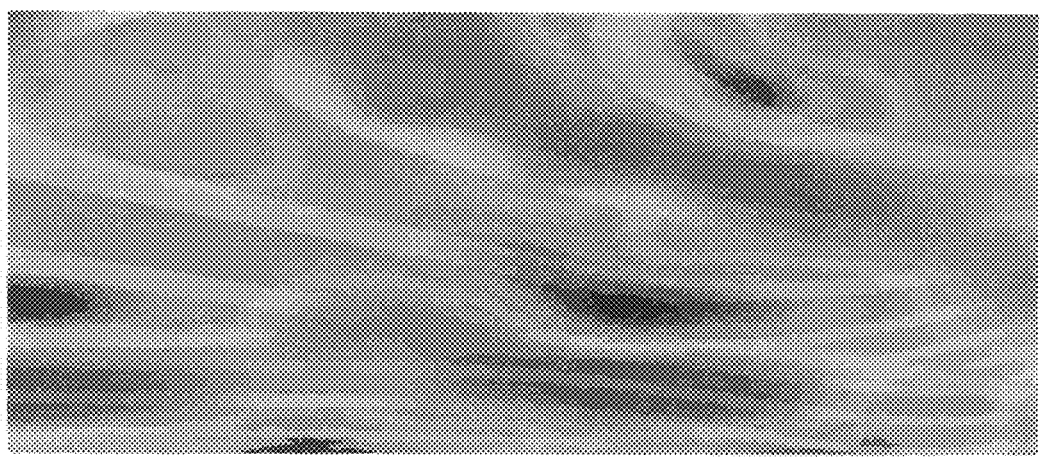
FIG. 9 is a diagram illustrating an example heat map.

If the affirmative/negative determination unit 15*c* determines that the first zebra image and the second zebra image do not match each other as a whole, that is, if the score for the entirety of the n superimposition images is less than the predetermined value, the heat map creation unit 15*d* creates a heat map from the superimposition images using Grad-CAM++. For example, when images shown in FIGS. 8A and 8B are used as the first zebra image with noise removed and the second zebra image with features extracted, a heat map as illustrated in FIG. 9 is created.

The heat map is created based on the results of determination of match and mismatch between a first selected image and a second selected image in each of the n superimposition images. In the heat map in FIG. 9, darker portions correspond to portions with strong responses in the final layer of the CNN 15*b*, that is, portions with greater degrees of mismatch between the first selected images and the second selected images.

When a user checks a determination result of match and mismatch between a first selected image and a second selected image in a pair, the probability acquisition unit 15 configured as described above presents the determination result of the affirmative/negative determination unit 15*c* on the display 1*a* in response to the user operation of the input interfaces 1*c*.

Figure 10:
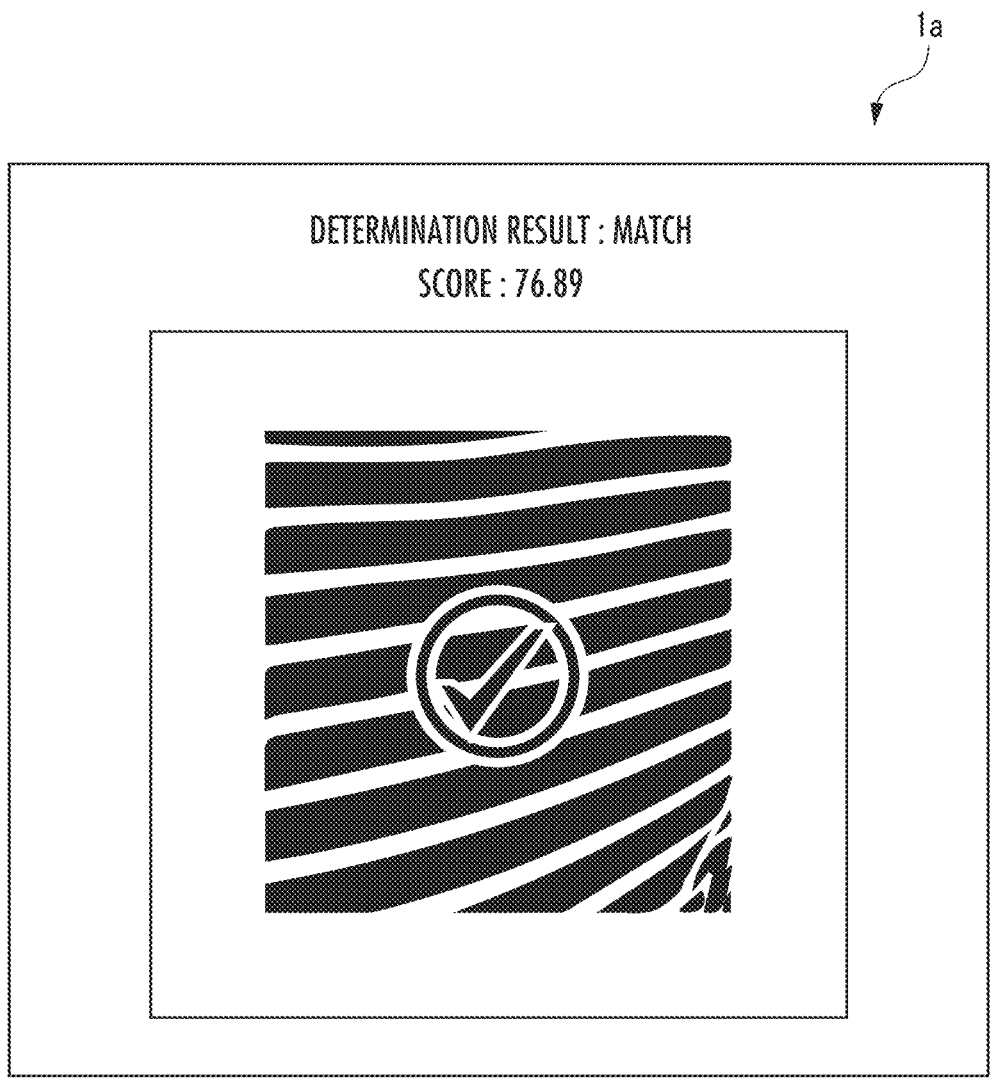
FIG. 10 is a diagram illustrating example presentation on a display when a first selected image and a second selected image match each other.

For example, if the affirmative/negative determination unit 15*c* determines a match between a first selected image and a second selected image in a pair, this determination result is presented as shown in FIG. 10. Specifically, text "determination result: match" and text "score: a numerical value (76.89 in FIG. 10)" are presented in an upper portion of the screen of the display 1*a*, under which the second selected image and a check mark signifying that the first selected image and the second selected image match each other are displayed.

When a user checks to see whether the first zebra image and the second zebra image match each other as a whole, the determination result of the affirmative/negative determination unit 15*c* is presented on the display 1*a* in response to operation similar to that described above.

Figure 11:
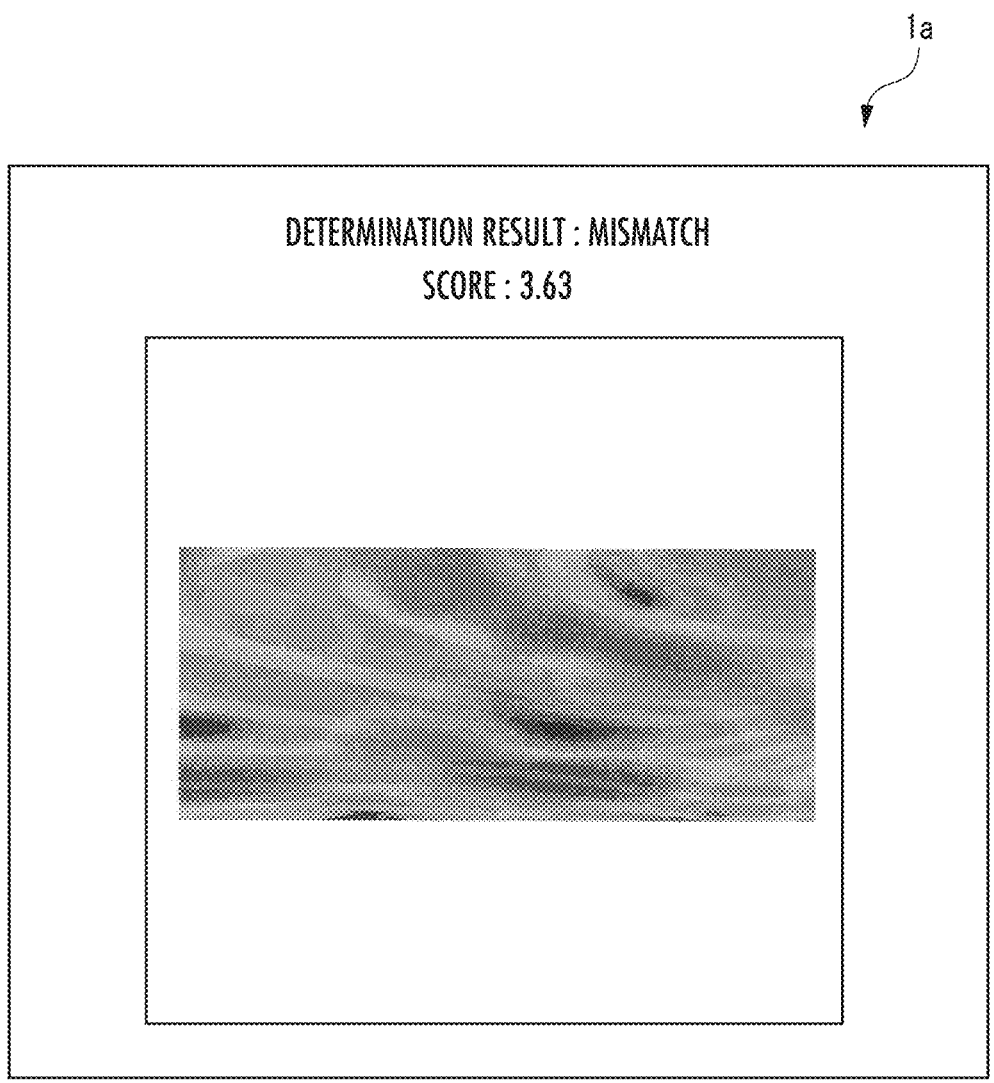
FIG. 11 is a diagram illustrating example presentation on the display when a first selected image and a second selected image do not match each other.

For example, when the affirmative/negative determination unit 15*c* determines that the first zebra image and the second zebra image do not match each other as a whole and the heat map creation unit 15*d* creates a heat map, the determination result and the heat map are presented on the display 1*a* as shown in FIG. 11. Specifically, text "determination result: mismatch" and text "score: a numerical value (3.63 in FIG.

11)" are presented in an upper portion of the screen of the display 1a, under which the heat map is displayed.

As described above, in the case of the probability acquisition apparatus 1 according to the present embodiment, an automotive clay model is scanned with a three-dimensional scanner to obtain point group data. Then, the point group data is subjected to the polygon mesh processing or the like to obtain polygon mesh data, which is rendered with shading to obtain a first image, which is three-dimensional.

Surface data is created from the polygon mesh data with CAD software, and the surface data is rendered with shading to obtain a second image, which is a simulated image. The second image is a three-dimensional image of a region identical to that of the first image and has an angle, a scale, and a length-by-width size identical to those of the first image.

A first selected image is obtained by subjecting a first zebra image to the median filter processing and the trimming processing; thus, in the first selected image obtained, the noise effect of the first zebra image can be inhibited. A second selected image is obtained by subjecting a second zebra image to the Sobel filter processing and the trimming processing so as to be an image region identical to that of the first selected image; thus, in the second selected image obtained, the characteristics of the image region selected from the second zebra image can be enhanced.

Then, the first selected image and the second selected image are superimposed to create a superimposition image. The superimposition image is input to the CNN 15b to obtain probabilities of a match and a mismatch between the first selected image and the second selected image.

As described above, model parameters are sufficiently learned with the CNN 15b using backpropagation or the like. Thus, by using the CNN 15b, accurate probabilities of a match and a mismatch between the first selected image and the second selected image can be obtained.

Furthermore, n pairs of a first selected image and a second selected image are obtained; thus, the degree of match/mismatch can be easily determined in portions of the first zebra image and the second zebra image with a large degree of mismatch, in portions thereof with a large degree of match, and in the first zebra image and the second zebra image as a whole. Additionally, if the degree of mismatch is high between a first selected image and a second selected image, a portion that causes the high degree of mismatch can be identified easily by using a heat map.

Moreover, the first zebra image and the second zebra image are subjected to the grayscale conversion; thus, the operation load during the image processing can be smaller than that with color images if used as the first zebra image and the second zebra image. Additionally, errors resulting from coloring conditions can be inhibited.

Figure 12:
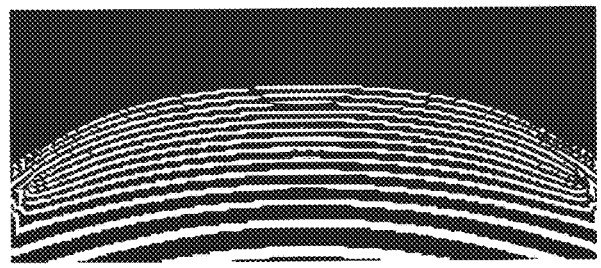
FIG. 12 is a diagram illustrating an example first zebra image with noise removed.
Figure 13:
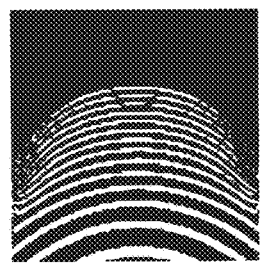
FIG. 13 is a diagram illustrating an example first selected image taken by trimming from the image in FIG. 12.

The trimming technique in the trimming unit 14c is not limited to the technique described above where a square portion is cut from an image, and another technique described below may be used. For example, when the first zebra image with noise removed and the second zebra image with features extracted that are input to the trimming unit 14c are images that are long sideways as illustrated in FIG. 12, a technique can be used where the image in FIG. 12 is resized to a square as illustrated in FIG. 13. In this case, one pair of a first selected image and a second selected image is obtained from the first zebra image with noise removed and the second zebra image with features extracted.

Figure 14:
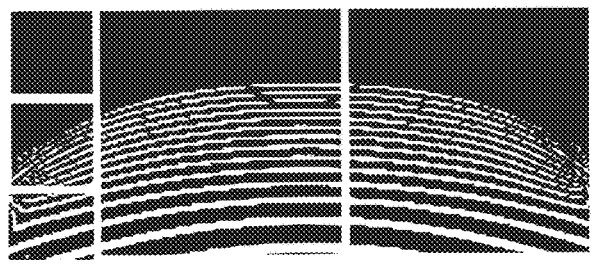
FIG. 14 is a diagram illustrating another example first selected image taken by trimming from the image in FIG. 12.
Figure 15:
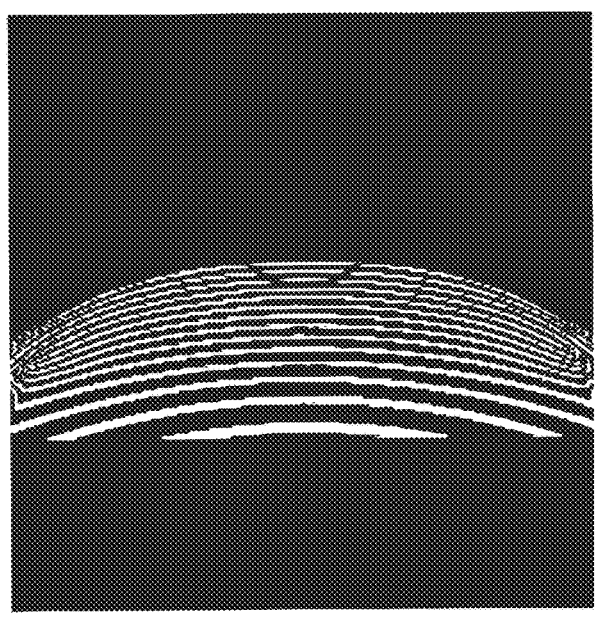
FIG. 15 is a diagram illustrating yet another example first selected image taken by trimming from the image in FIG. 12.

Another technique may be used where the image in FIG. 12 is divided into a plurality of squares as illustrated in FIG. 14. In this case, more than one pair of a first selected image and a second selected image are obtained from the first zebra image with noise removed and the second zebra image with features extracted. Yet another technique may be used where the image that is long sideways in FIG. 12 is scaled so as to be at the center of a square image as illustrated in FIG. 15. In this case, one pair of a first selected image and a second selected image is obtained from the first zebra image with noise removed and the second zebra image with features extracted.

While an embodiment has been described in which an automotive clay model is used as a target object, the target object of the present invention is not limited to this example, and other objects may be used as a target object. For example, a dryer or an iron may be a target object, or other industrial devices may be a target object.

While an embodiment has been described in which the first image is an image obtained by converting point group data obtained with a 3D scanner from a target object to polygon mesh data and rendering the polygon mesh data with shading, the first image of the present invention is not limited to this example and may be any three-dimensional image obtained from data taken by measuring or imaging a target object. For example, the first image may be a three-dimensional image created from imaging data of a target object captured with a high-accuracy digital camera.

While an embodiment has been described in which the second image is a simulated image obtained by converting point group data obtained with a 3D scanner from a target object to polygon mesh data, creating surface data using CAD software from the polygon mesh data, and rendering the surface data with shading, the second image of the present invention is not limited to this example and may be any three-dimensional simulated image of a target object. For example, the second image may be a simulated image created from polygon mesh data using a 3D rendering technique other than CAD software.

While an embodiment has been described in which a CNN is used as a predetermined machine learning model, the predetermined machine learning model of the present invention is not limited to this example and may be any model that receives a first selected image and a second selected image and outputs probabilities of a match and a mismatch between the first selected image and the second selected image. For example, the predetermined machine learning model may be a DNN (deep neural network) or an RNN (recurrent neural network).

While an embodiment has been described in which the predetermined first image processing is the median filter processing and the trimming processing, the predetermined first image processing of the present invention is not limited to this example and may be any processing that is performed on an image region selected from the first zebra image to provide the first selected image. For example, the predetermined first image processing may be smoothing filter processing and trimming processing.

An embodiment has been described as an example in which the predetermined noise removal processing is the median filter processing. Alternatively, dilation erosion processing may be used.

While an embodiment has been described in which a predetermined feature extraction processing and the trimming processing are the predetermined second image processing, the predetermined second image processing of the present invention is not limited to this example and may be any processing that is performed on an image region that is selected from the second zebra image and identical to that of the first selected image to provide the second selected image.

For example, the predetermined second image processing may be edge processing and trimming processing.

An embodiment has been described as an example in which the predetermined feature extraction processing is the Sobel filter processing. Alternatively, the predetermined feature extraction processing may be one of a Canny method and a skelton method.

An embodiment has been described as an example in which the first zebra image and the second zebra image are images obtained using grayscale conversion. Alternatively, the first zebra image and the second zebra image may be color images. If the first zebra image and the second zebra image are color images, the operation load may be increased during the image processing and errors may result from coloring conditions. Thus, it is advantageous to use images obtained using grayscale conversion as in the embodiment described above.

REFERENCE SIGNS LIST 1 probability acquisition apparatus
11 first image acquisition unit
12 second image acquisition unit
13 zebra image acquisition unit
14 selected-image acquisition unit
15 probability acquisition unit
15b CNN

What is claimed is:

1. A probability acquisition apparatus comprising:
a first image acquisition unit configured to obtain a first image that is a three-dimensional image of a target object from data taken by measuring or imaging the target object;
a second image acquisition unit configured to obtain a second image that is a three-dimensional simulated image of the target object;
a zebra image acquisition unit configured to obtain a first zebra image by subjecting the first image to zebra shading processing and a second zebra image by subjecting the second image to the zebra shading processing, the first zebra image and the second zebra image having an identical angle, an identical scale, and an identical length-by-width size;
a selected-image acquisition unit configured to obtain a first selected image by selecting at least an image region of the target object from the first zebra image and subjecting the image region selected from the first zebra image to predetermined first image processing and to obtain a second selected image by selecting an image region identical to that of the first selected image from the second zebra image and subjecting the identical image region selected from the second zebra image to predetermined second image processing; and
a probability acquisition unit configured to input the first selected image and the second selected image to a predetermined machine learning model so as to obtain probabilities of a match and a mismatch between the first selected image and the second selected image as output of the predetermined machine learning model.

2. The probability acquisition apparatus according to claim 1, wherein
the image region selected from the first zebra image is subjected to predetermined noise removal processing in the predetermined first image processing, and the identical image region selected from the second zebra image is subjected to predetermined feature extraction processing in the predetermined second image processing.

3. The probability acquisition apparatus according to claim 2, wherein
the predetermined noise removal processing is one of median filter processing and dilation erosion processing.

4. The probability acquisition apparatus according to claim 2, wherein
the predetermined feature extraction processing is one of Sobel filter processing, a Canny method, and a skelton method.

5. The probability acquisition apparatus according to claim 1, wherein
the zebra image acquisition unit obtains both of the first zebra image and the second zebra image in grayscale.

6. The probability acquisition apparatus according to claim 1, wherein
the predetermined machine learning model is a CNN,
the selected-image acquisition unit obtains the first selected image and the second selected image that have an aspect ratio of 1:1, and
the probability acquisition unit inputs a superimposition image obtained by superimposing the first selected image and the second selected image to the CNN.

7. A probability acquisition method comprising:
obtaining a first image that is a three-dimensional image of a target object from data taken by measuring or imaging the target object;
obtaining a second image that is a three-dimensional simulated image of the target object;
obtaining a first zebra image by subjecting the first image to zebra shading processing and a second zebra image by subjecting the second image to the zebra shading processing, the first zebra image and the second zebra image having an identical angle, an identical scale, and an identical length-by-width size;
obtaining a first selected image by selecting at least an image region of the target object from the first zebra image and subjecting the image region selected from the first zebra image to predetermined first image processing;
obtaining a second selected image by selecting an image region identical to that of the first selected image from the second zebra image and subjecting the identical image region selected from the second zebra image to predetermined second image processing; and
inputting the first selected image and the second selected image to a predetermined machine learning model so as to obtain probabilities of a match and a mismatch between the first selected image and the second selected image.

* * * * *